(12) United States Patent
Newswander et al.

(10) Patent No.: US 8,947,777 B2
(45) Date of Patent: Feb. 3, 2015

(54) MULTIPLE PETAL DEPLOYABLE TELESCOPE

(75) Inventors: Trent Newswander, Logan, UT (US);
Blake Crowther, Preston, ID (US);
James Champagne, Logan, UT (US);
Adam Norris, Logan, UT (US)

(73) Assignee: Utah State University Research Foundation, North Logan, UT (US)

( * ) Notice: Subject to any disclaimer, the term of this patent is extended or adjusted under 35 U.S.C. 154(b) by 0 days.

(21) Appl. No.: 13/885,140

(22) PCT Filed: Feb. 27, 2012

(86) PCT No.: PCT/US2012/026782
§ 371 (c)(1),
(2), (4) Date: May 13, 2013

(87) PCT Pub. No.: WO2012/116366
PCT Pub. Date: Aug. 30, 2012

(65) Prior Publication Data
US 2013/0229709 A1    Sep. 5, 2013

Related U.S. Application Data

(60) Provisional application No. 61/446,617, filed on Feb. 25, 2011.

(51) Int. Cl.
*G02B 23/18*    (2006.01)
*G02B 23/00*    (2006.01)
(Continued)

(52) U.S. Cl.
CPC ............... *G02B 23/02* (2013.01); *G02B 23/20* (2013.01); *H04B 10/118* (2013.01); *G02B 23/2476* (2013.01)
USPC ............................ 359/399; 359/408; 359/409

(58) Field of Classification Search
CPC .......... G02B 7/00; G02B 7/003; G02B 7/005; G02B 7/182; G02B 7/183; G02B 7/198; G02B 23/00; G02B 23/02; G02B 23/16; G02B 23/20; G02B 23/2476
USPC .................................. 359/399, 405–406, 817
See application file for complete search history.

(56) References Cited

U.S. PATENT DOCUMENTS 3,715,760 A * 2/1973 Palmer ........................... 343/915
4,780,726 A * 10/1988 Archer et al. .................. 343/881
(Continued)

FOREIGN PATENT DOCUMENTS

EP    1873061 A1    6/2006

OTHER PUBLICATIONS

Fellowes, Kinematic and Quasi-Kinematic Constraints: What They Are & How They Work, Tutorial on Kinematic Constraints, Dec. 11, 2006, p. 1-8, The University of Arizona College of Optical Sciences, Tucson, Arizona.

(Continued)

*Primary Examiner* — Thong Nguyen

(57) ABSTRACT

An opto-mechanical deployable telescope includes a hub, at least one deployable multiple petal primary mirror mounted to the hub, a deployment assembly, and a deployment engine assembly. The deployment assembly is operable to move the at least one primary mirror between a stowed position and a deployed position. The deployment engine assembly is operable to power the deployment assembly using stored mechanical energy. The deployment assembly includes a kinematic or semi-kinematic interface between the hub and the at least one primary mirror to hold petals of the at least one primary mirror in alignment relative to each other in the deployed position.

18 Claims, 12 Drawing Sheets

(51) Int. Cl.
  *G02B 23/02* (2006.01)
  *G02B 23/20* (2006.01)
  *H04B 10/118* (2013.01)
  *G02B 23/24* (2006.01)

(56) References Cited

U.S. PATENT DOCUMENTS

| | | |
|---|---|---|
| 5,687,017 A | 11/1997 | Katoh |
| 5,864,324 A | 1/1999 | Acker et al. |
| 6,191,757 B1 * | 2/2001 | Bassily et al. ............... 343/915 |
| 6,299,105 B1 | 10/2001 | Gilmore |
| 6,441,801 B1 | 8/2002 | Knight et al. |
| 6,550,209 B2 * | 4/2003 | Meguro et al. ............... 52/653.1 |
| 6,767,155 B2 * | 7/2004 | O'Brien et al. ............ 403/322.1 |
| 6,768,582 B1 | 7/2004 | Hachkowski et al. |
| 6,930,654 B2 | 8/2005 | Schmid et al. |
| 2004/0233523 A1 | 11/2004 | Hachkowski |

OTHER PUBLICATIONS

PCT/US2012/026782 International Search Report and Written Opinion mailed Dec. 28, 2012.

* cited by examiner

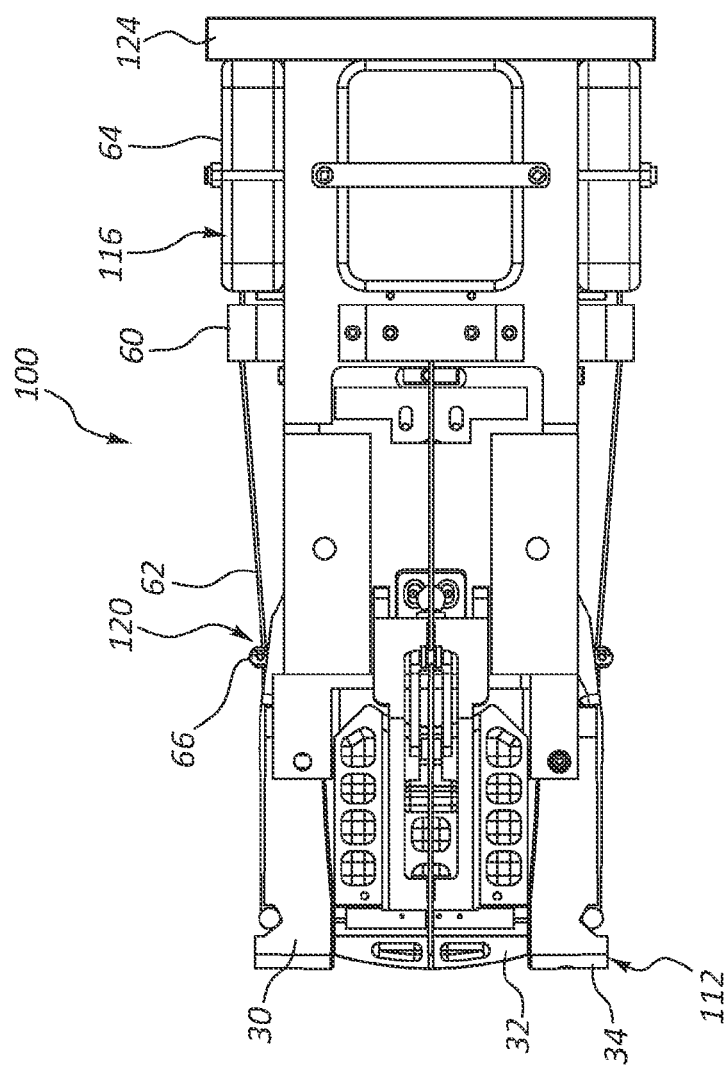
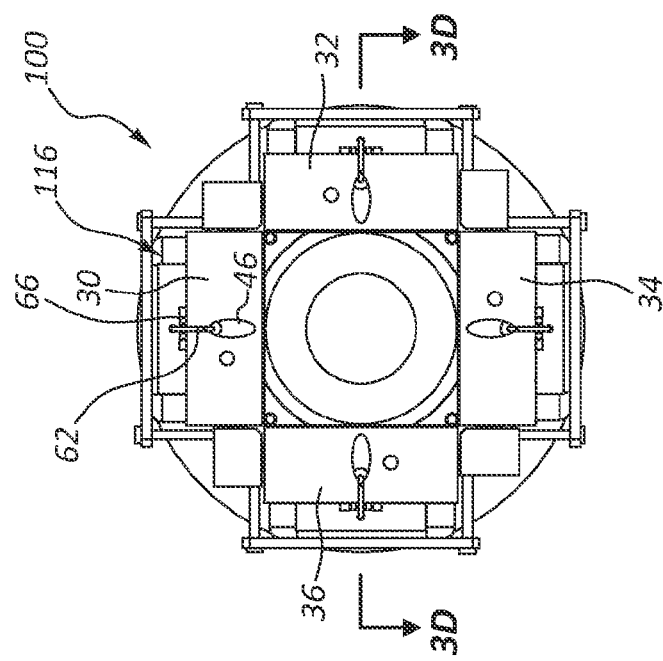
FIG. 3B
FIG. 3C

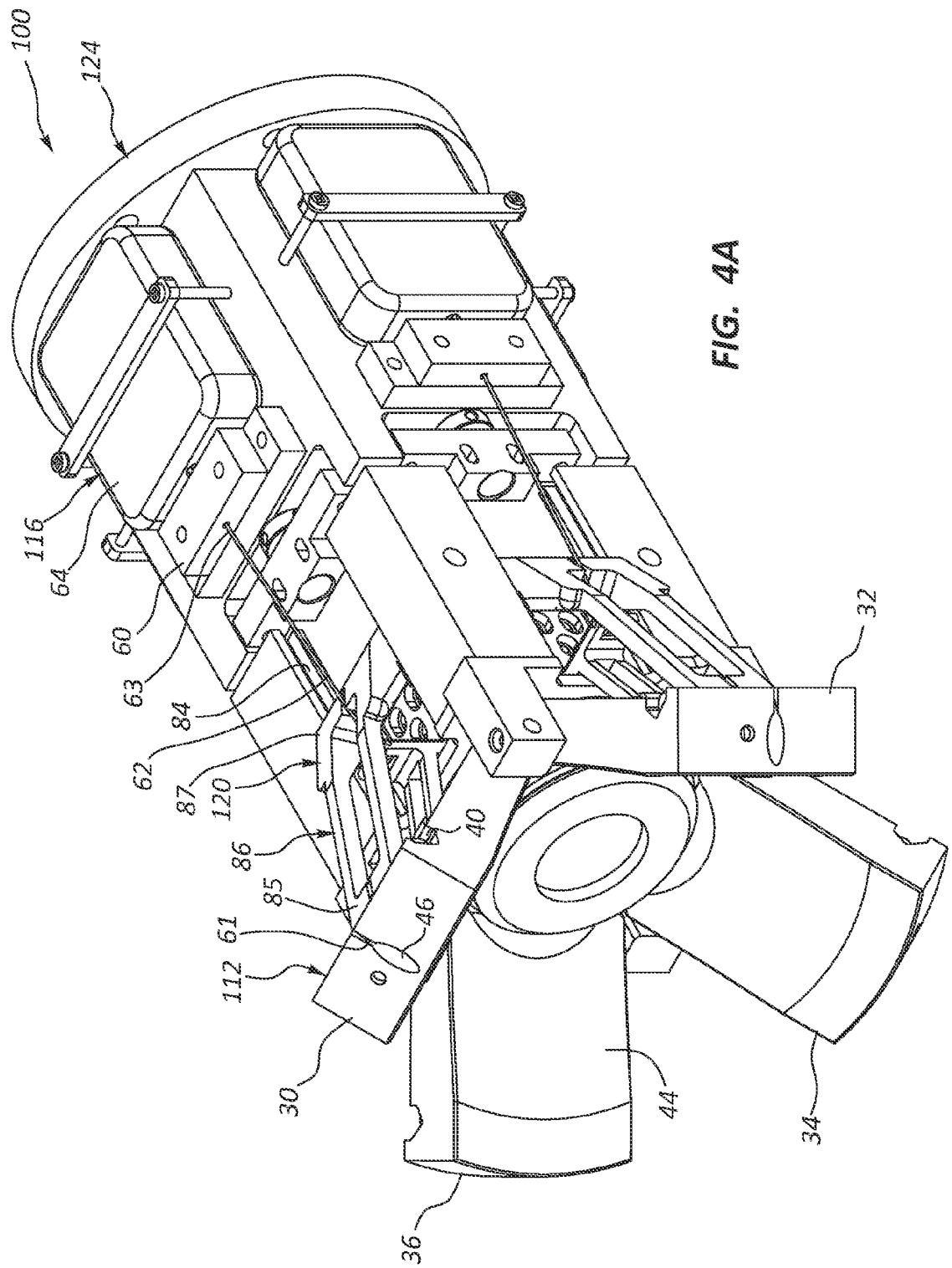

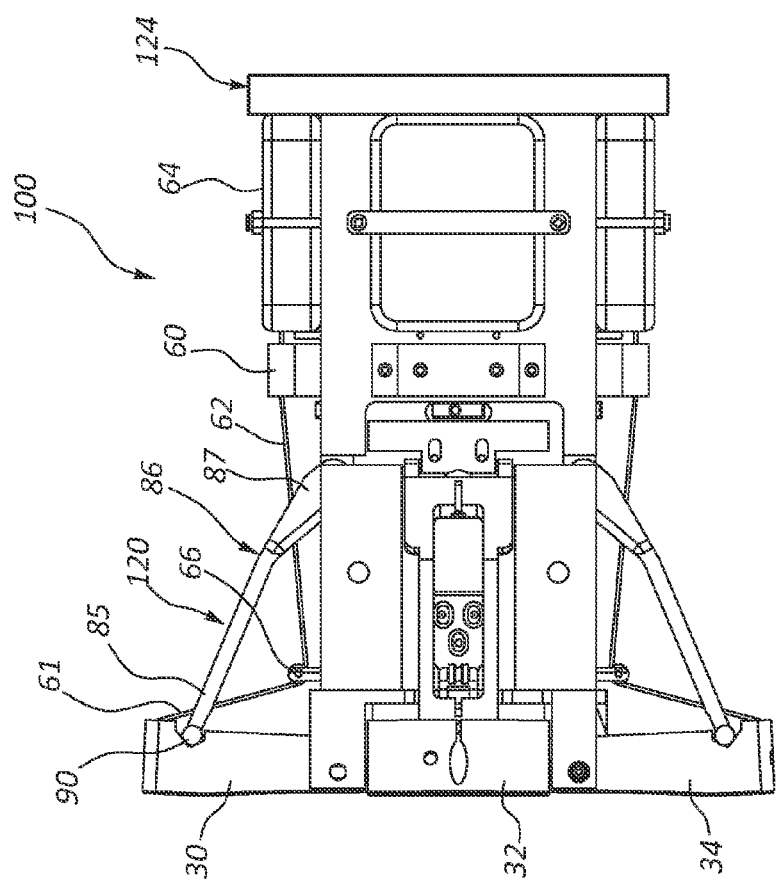
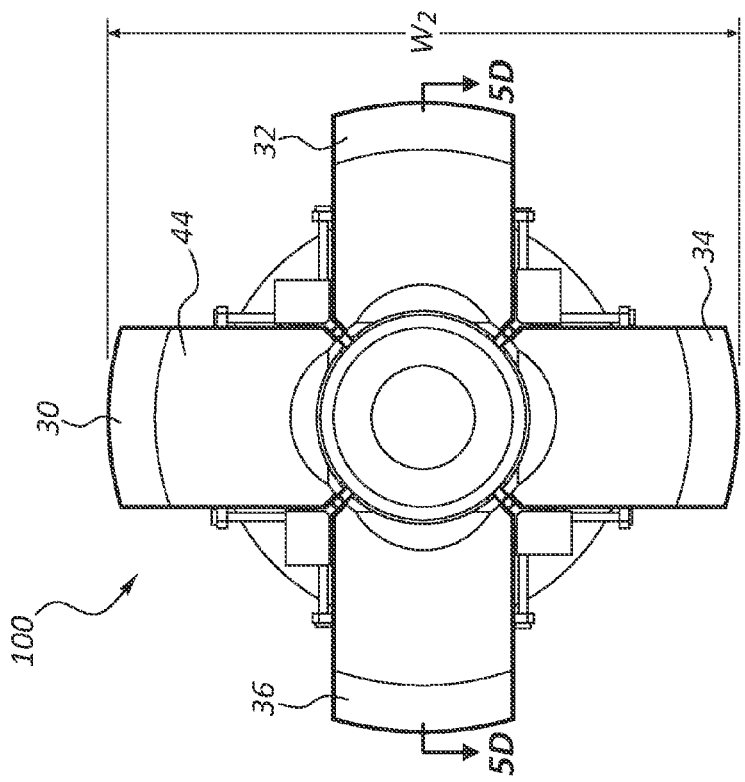
FIG. 5C
FIG. 5B

MULTIPLE PETAL DEPLOYABLE TELESCOPE

CROSS-REFERENCE TO RELATED APPLICATIONS

This application claims priority to U.S. Provisional Patent Application No. 61/446,617, filed Feb. 25, 2011, and entitled MULTIPLE PETAL DEPLOYABLE TELESCOPE, the disclosure of which is incorporated by reference herein, in its entirety.

TECHNICAL FIELD

The present application relates generally to constrained volume optical systems, and more particularly relates to small package opto-mechanical telescope designs that provide relatively high signal levels and resolutions.

BACKGROUND

Small satellites offer promise for increased instrument presence in space as well as for tactical quick turn missions. However, small satellites fall short in optical performance due to their relatively small aperture size. Even the most precision optical instruments are limited by basic physics. With small aperture optical sensors in space, diffraction often limits the imaging resolution. For a circular aperture, this diffraction blur angle may be estimated using the following equation:

$$\text{blur angle} = (1.22\lambda)/D$$

Where $\lambda$ is the wavelength and $D$ is the diameter of the optical aperture. The diffraction limited imaging resolution is directly proportional to wavelength and inversely proportional to aperture extent or diameter regardless of the shape of the aperture.

In addition to the assumption of diffraction limitation, this simple relationship of resolution and optical aperture assumes that the viewed object radiance is sufficient for adequate signal to noise ratio. Grainy images and insufficient contrast, caused by a lack of signal or too much noise, are common manifestations of the lack of signal to noise ratio.

The same reasoning can be applied to sensors that are required to be transported when mass or volume is an important system driver. An optical system used for surveillance or communication may need to be transported by a human being, small vehicle, etc. The same physics discussed above concerning space sensors and aperture applies to resolution and signal in these and other situations.

A need exists for systems and methods that can overcome diffraction limitations and signal to noise limitations with improved optical performance.

SUMMARY OF THE INVENTION

One aspect of the present disclosure relates to a deployable telescope system that provides a larger entrance aperture than the package in which it is housed. The opto-mechanical telescope design may achieve higher signal levels and resolution in a smaller package. The deployable telescope system, for example, can be launched on a 10 cm pico size cube satellite and provide a partial aperture 23 cm diameter primary mirror. A variant of the deployable telescope could also be packaged in a 20 cm man portable package and provide a 46 cm diameter primary mirror. This may be accomplished by incorporating multiple fold-out primary mirror petals or segments into the design. The mirror petals are individual segments of the mirror and the mirror may be referred to as segmented mirror. The telescope system size can be scaled with the available package volume, thus the deployable telescope design can be applied to various constrained volume systems, such as satellites or other small transportation vehicles.

Another aspect of the present disclosure relates to an opto-mechanical deployable telescope that includes a hub, at least one deployable multiple petal primary mirror mounted to the hub, a deployment assembly, and a deployment engine assembly. The deployment assembly is operable to move the at least one primary mirror between a stowed position and a deployed position. The deployment engine assembly is operable to power the deployment assembly using stored mechanical energy. The deployment assembly includes a kinematic or semi-kinematic interface between the hub and the at least one primary mirror to hold petals of the at least one primary mirror in alignment relative to each other in the deployed position.

The telescope may also include a deployable support structure and at least one secondary mirror carried by the deployable support structure, wherein the at least one secondary mirror is positionable relative to the at least one primary mirror to optimize optical imaging on a focal plane. The telescope may include a baffling deployable into a position around the at least one primary mirror. The telescope may include a radiation detector positioned at an optical focus of the telescope. The deployment assembly may include a radial and axial positioning member that defines at least in part the deployed position, wherein the radial and axial positioning member includes at least one precision positioning structure, which may be flat, toroidal, spherical, or otherwise shaped, on a petal of the at least one primary mirror or the hub.

The deployment assembly may include a spar having a first end connected to a petal of the at least one primary mirror with a first interface, the first interface including a cylinder positioned in a V-groove, and a second end connected to the hub with a second interface, the second interface including a sphere positioned in a conical recess. The telescope may include a detector configured to view voids between petals of the at least one primary mirror and associated background irradiance, wherein the background irradiance is compensated for using progressive non-uniformity compensation. The deployment assembly may include a clamp that applies a radially inward directed force to a petal of the at least one primary mirror when in the deployed position. The deployment assembly may include at least one cable connecting the deployment engine assembly to a petal of the at least one primary mirror.

The at least one primary mirror may include an aperture size when in the deployed position that is greater than a maximum width dimension of the hub. The deployment engine assembly may include at least one compressed spring engine that provides positive pressure to hold petals of the at least one primary mirror in the deployed position. The baffling may include a spring loaded collapsible support. Each petal of the at least one primary mirror may be separately attached to the hub with a hinge connection that provides radial movement of the petals when in the deployed position that permits the deployment assembly rather than the hinge connection to control alignment of the petals.

A further aspect of the present disclosure relates to an opto-mechanical deployable telescope that includes a hub, a deployable primary mirror, and a deployment assembly. The deployable primary mirror is positioned on the hub and includes a plurality of petals that are pivotable between a stowed position and a deployed position. The deployment assembly is configured to operate the plurality of petals between the stowed and deployed positions and hold the plurality of petals in alignment relative to each other in the deployed position using a kinematic or semi-kinematic interface between the hub and the plurality of petals.

The deployment assembly may include a separate stored energy device to deploy each individual petal. The deployment assembly may include a plurality of point contact interfaces between the hub and the plurality of petals that controls alignment of the plurality of petals and the hub. The deployment assembly may include a separate actuator deployment device to deploy each individual petal, wherein the actuator deployment device comprises a shape memory material.

A further aspect of the present disclosure relates to a method of deploying an opto-mechanical deployable telescope. The method includes providing a hub, at least one primary mirror mounted to the hub, and a deployment assembly, wherein the at least one primary mirror includes a plurality of petals. The method also includes moving the plurality of petals from a stowed position to a deployed position with the deployment assembly, and aligning the plurality of petals relative to each other with the deployment assembly while moving the plurality of petals into the deployed position.

Aligning the plurality of petals may include providing a kinematic or semi-kinematic interface between the plurality of petals and the hub. Aligning the plurality of petals may include providing a first interface including a cylinder positioned in a V-groove, a second interface including a sphere positioned in a conical recess, and an axial and radial positioning arrangement operable between the hub and the plurality of petals. The deployment assembly may include a separate stored energy engine and cable for each of the plurality of petals with the cable interconnecting the petal to the stored energy engine. Moving the plurality of petals may include applying tension in the cables with the stored energy engines.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 3B is a side view of the opto-mechanical deployable telescope of FIG. 3A.

FIG. 3C is a front view of the opto-mechanical deployable telescope of FIG. 3A.

FIG. 4A is a perspective view of the opto-mechanical deployable telescope of FIG. 3A in a partially deployed position in accordance with the present disclosure.

FIG. 5B is a side view of the opto-mechanical deployable telescope of FIG. 5A.

FIG. 5C is a front view of the opto-mechanical deployable telescope of FIG. 5A.

Figure 1:
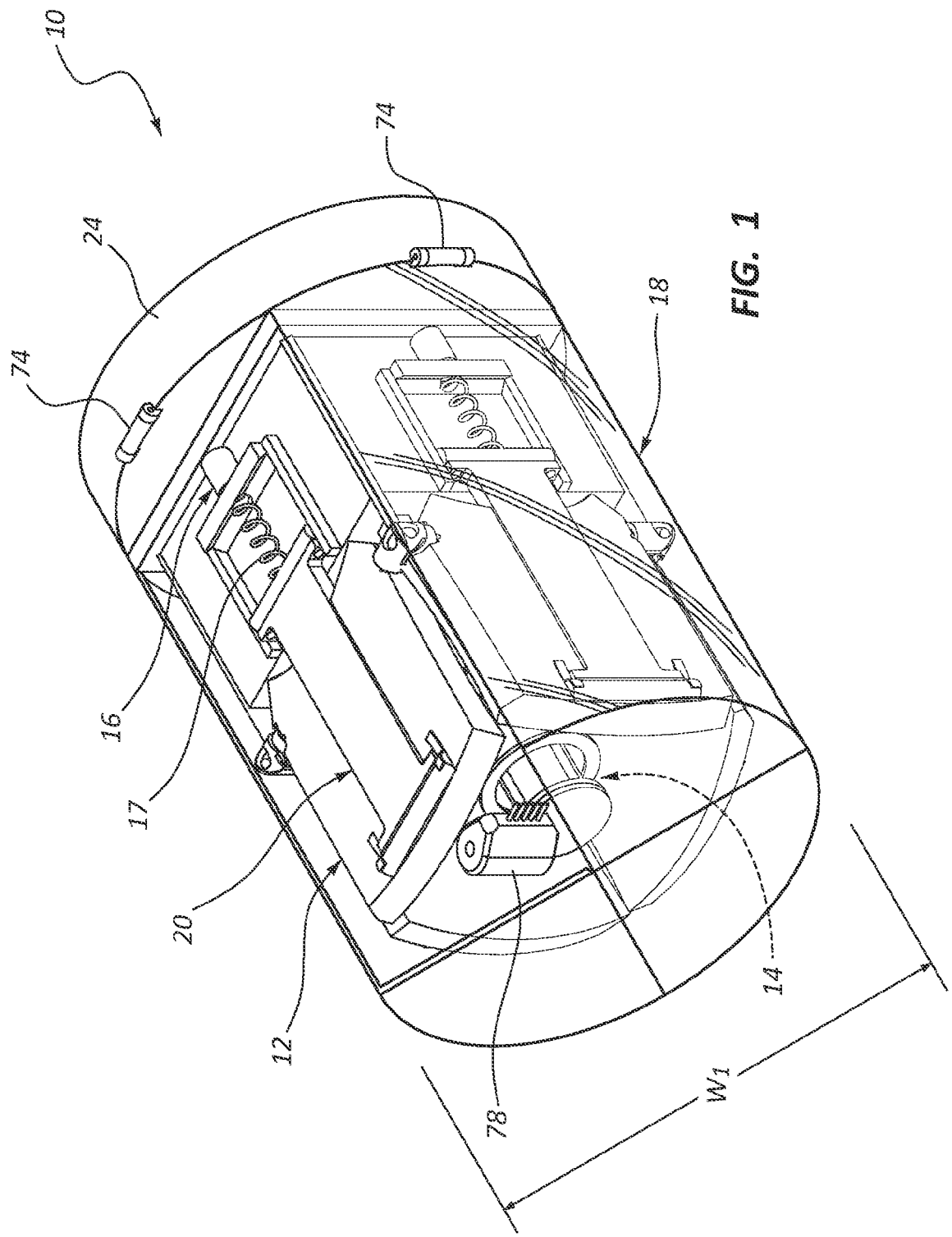
FIG. 1 is a perspective view of an example opto-mechanical deployable telescope in a stowed position in accordance with the present disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

BEST MODE(S) FOR CARRYING OUT THE INVENTION

The present disclosure is directed to deployable telescopes, and more specifically related to opto-mechanical deployable telescopes. One aspect of the present disclosure relates to deployment and alignment systems for a multiple petal primary mirror of the telescope. The alignment system may use a kinematic or semi-kinematic (also referred to as "quasi-kinematic") constraint system to align the petals relative to each other when the primary mirror is in a deployed position. The primary mirror may have a passive alignment and deployment system that uses stored mechanical energy to deploy the petals and orient the petals relative to each other. The stored mechanical energy may concurrently deploy the petals and align the petals relative to each other. The alignment system for the primary mirror may include a plurality of precision machined interfaces that define the kinematic or semi-kinematic constraints that provide positioning of the petals of the primary mirror in a deployed position that is repeatable each time the primary mirror is deployed.

Another aspect of the present disclosure relates to a telescope system that provides a larger entrance aperture than the package in which the telescope is initially housed. For example, the deployable telescope described herein may support persistent space-based imaging by enabling the use of larger imaging systems that rely on active structures and mechanisms. Pico size cube satellites containing the deployable telescopes described herein may support tactically responsive missions. Doubling the aperture size may provide at least twice the diffraction limited performance and may produce increased radiometric sensitivity for viewing extended sources. Alternatively, the deployable telescope may support free space laser communications by achieving a larger aperture and hence increased signal levels that may otherwise be realized from a small package volume.

In one example, the deployable telescope designs disclosed herein may provide a means for achieving higher signal levels and resolution in a smaller stowed package size. In one example, the deployable telescope may be launched on a 10 cm size cube satellite and provide a partial aperture primary mirror having a deployed size of about 23 cm. This ratio of stowed versus deployed size may be accomplished by incorporating multiple foldout primary mirror petals as part of the primary mirror. The deployable telescope size may be scaled with the package size so that the deployable telescope design may be applied to larger telescopes such as meter-class apertures stowed in 40 cm cube packages.

Figure 2:
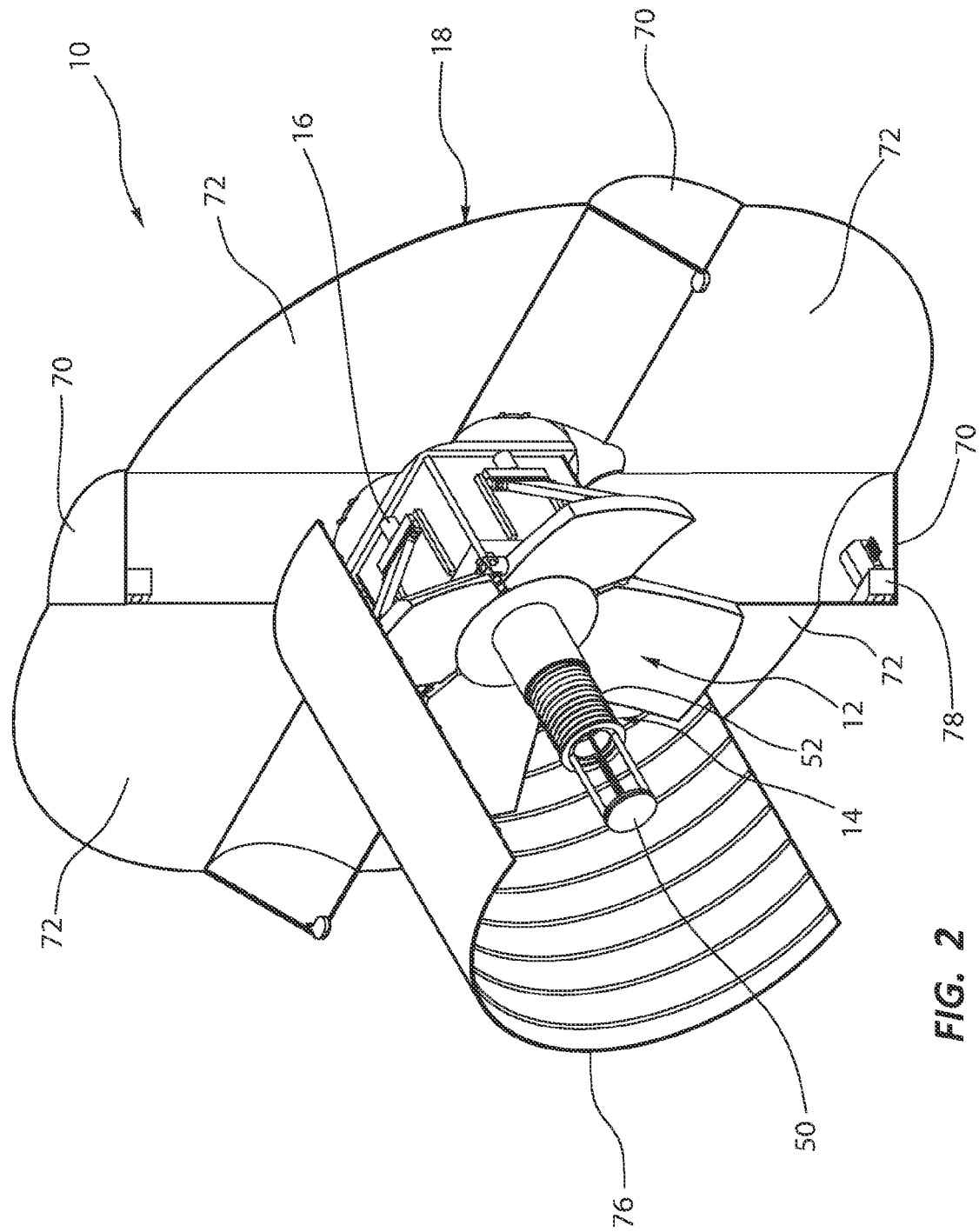
FIG. 2 is a perspective view of the opto-mechanical deployable telescope of FIG. 1 in a deployed position.
Figure 5A:
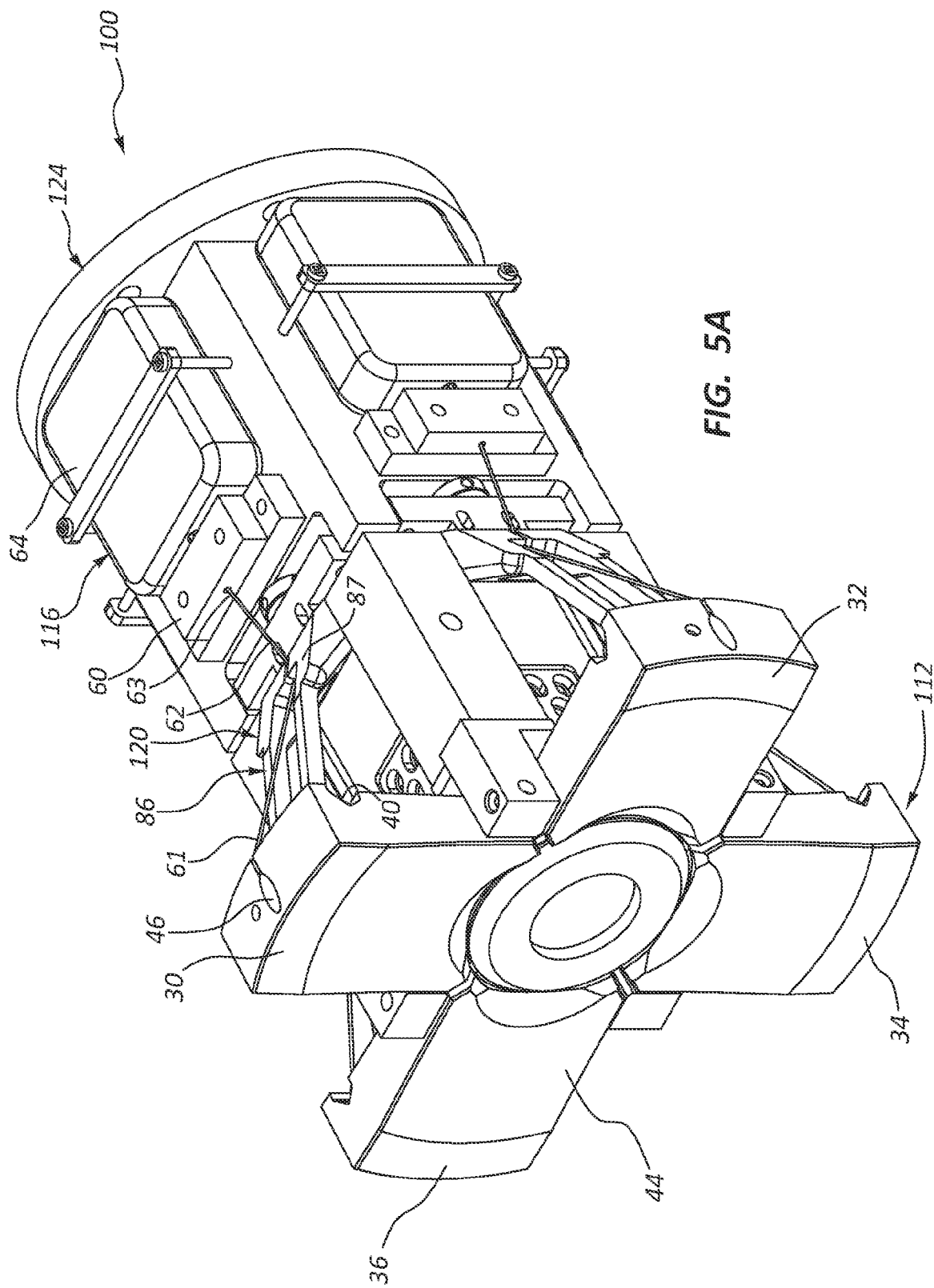
FIG. 5A is a perspective view of the opto-mechanical deployable telescope of FIG. 3A in a deployed position in accordance with the present disclosure.
Figure 5D:
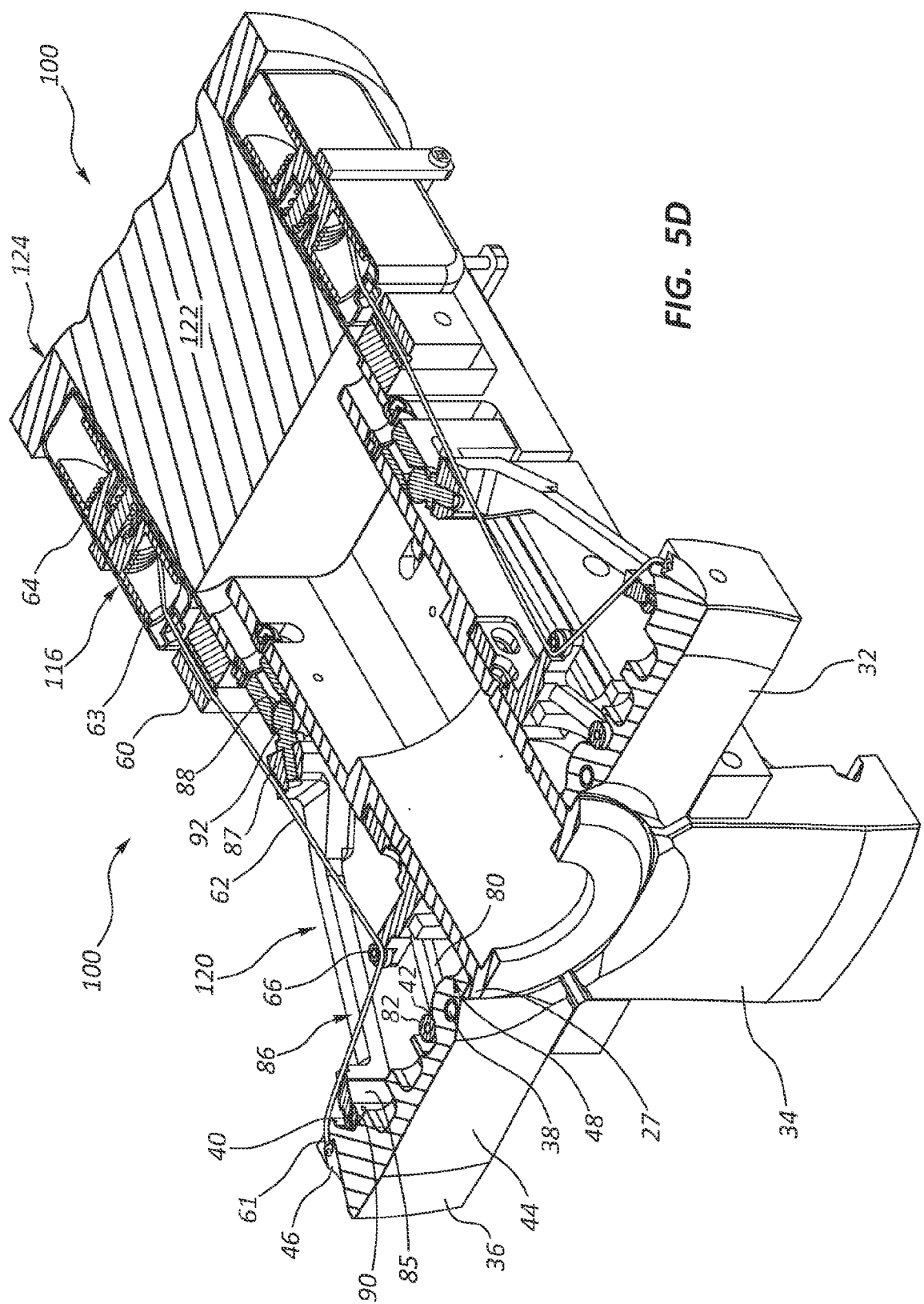
FIG. 5D is a cross-sectional perspective view of the opto-mechanical deployable telescope of FIG. 5C taken along cross-section indicators 5D-5D.

Referring to FIGS. 1 and 2, an example opto-mechanical deployable telescope 10 is shown in stowed and deployed positions, respectively. The telescope 10 includes a primary mirror 12, a support structure 14, an engine assembly 16, baffling 18, an alignment system 20, and a chassis hub 24. Various features included in the support structure 14, engine assembly 16, alignment system 20 and hub 24 may be included in a deployment assembly or an alignment assembly of the telescope 10 that operates to move the primary mirror 12 between stowed and deployed positions. The telescope 10 in the stowed position of FIG. 1 may have a maximum width $W_1$. The telescope in the deployed position (e.g., see FIG. 5C) may have an effective opening size of $W_2$. The deployed width $W_2$ is typically at least twice as great as the stowed width $W_1$.

The primary mirror 12 includes a plurality of petal members that move between stowed (see FIG. 1) and deployed (see FIG. 2) positions. The support structure 14 includes a secondary mirror 50 that moves from a stowed position (see FIG. 1) to a deployed position (see FIG. 2) by operation of a telescoping member 52. The engine assembly 16 includes at least one stored energy engine operable to move the petals of the primary mirror between the stowed and deployed positions, and operate the support structure 14 to move the secondary mirror 50 into the deployed position shown in FIG. 2.

In one example, the engine assembly 16 includes a separate engine that operates each individual petal of the primary mirror. The engine assembly may also include a separate engine that operates the support structure 14. In some examples, the engine assembly may also include at least one engine that operates the baffling 18 from the stowed to the deployed positions shown in FIGS. 1 and 2, respectively. The engines of the engine assembly 16 may comprise at least one biasing member or spring 17 (see FIG. 1). The biasing member may be, for example, a compression, extension or coil spring. The engines of the engine assembly may be actuated automatically upon release of the primary mirror 12 or baffling 18 (e.g., when the baffling 18 is released, the primary mirrors 12 are free to move to the deployed position under power of the engine assembly 16).

Other types of stored energy engines (also referred to as stored energy motors or power devices) may be used to deploy various features of telescope 10. For example, individual devices driven by actuation of a shape memory material such as a shape memory alloy may be used to deploy petals of the primary mirror 12 or portions of the baffling 18. The actuator devices may be complex or simply a shape memory alloy or shape memory composite material that when heated with an electrical current moves to a pre-memorized form or shape releasing or pulling the deployment feature with it. In one concept (not shown), a folded nitinol rod is attached to the petal spar and base hub structure. This nitinol has been conditioned to straighten when heated. Deployment of the petal is actuated by an electrical current heating the nitinol rod causing the rod to straighten pulling the spar and the petal into the deployed position.

The baffling 18 may include a plurality of baffling cover members 70 (one of which is removed in FIG. 1 for visualization purposes), an expandable baffling portion 72, baffling hinges 74, a cylindrical baffle 76, and an actuator 78. The expandable baffling portion 72 may extend between each of the baffling cover members 70 (see FIG. 2). The baffling cover members 70 may be pivotally mounted to the hub 24 with the baffle hinges 74. The cylindrical baffle 76 may expand axially and radially upon release of the baffling cover members 70. In one example, the cylindrical baffle 76 extends further distally than a position of the secondary mirror 50 in the deployed position shown in FIG. 2. The actuator 78 may be remotely operated to release the baffling cover members 70. In one example, the actuator 78 comprises a bolt cutter or release mechanism, which when actuated permits the baffling cover members to open into the deployed position shown in FIG. 2.

The petal members of the primary mirror 12 provide an aperture larger than the size of the initial stowed package of FIG. 1. This approach makes possible a sparse aperture that approximates a full circle aperture, which, in this example, is a cross-shaped aperture that has full diffraction performance in both tangential and saggital planes, but reduced resolution on the diagonals.

The primary mirror petals may utilize positive deploying and locking clamp hinges and other alignment features. In one example, at the extent of hinge rotation in a deployed position, out of ramp features push the deployed petal inward and downward into a precision, kinematic or semi-kinematic alignment interface. Precision locating seats and diameters may be manufactured flat and perpendicular with high accuracy. A compressed spring engine or other stored energy device may provide positive pressure to hold the mirror petals in a final deployed position wherein each petal is aligned relative to the others without the need for additional adjustment using alternative adjustment means. The secondary mirror may deploy in a similar fashion with the mechanism providing positive pressure through a precision kinematic or a semi-kinematic alignment interface.

The cylindrical baffle 76 may be referred to as a cylindrical sun shade baffle membrane that surrounds the primary mirror petals. The cylindrical baffle 76 may reduce stray light from reaching a radiation detector position within the hub 24. The cylindrical baffle 76 may also provide thermal radiation shielding in orbit, thus minimizing thermal irradiants. The baffling 18 may include a spring-loaded collapsible structure, thermal blankets, and high emissivity materials with flexible rigid supports providing longitudinal stiffness. Portions of the baffling 18 (e.g., the cylindrical baffle 76) may spring into a cylindrical shape when released. The flexible rigid supports may utilize a tape measure type cross-section that is flexible when bent or buckled, but provides substantial stiffness when extended. In other embodiments, the baffle 18 comprises a polymeric membrane without a defined form in the stowed position. Upon release and exposure to ultraviolet radiation, at least the cylindrical baffle 76 forms a trans-cylindrical shape.

In satellite applications, precision alignment and stability of the deployable telescope should be reliably attained in the spacecraft environment under severe launch vibration and shock, exposure to thermal environments, and lengthy stowed storage. For terrestrial free-space laser communications and surveillance applications, the same precision alignment and stability should be attained after rough transportation, uncertain thermal conditions, and storage. The optical imaging performance of the deployable telescope is typically sensitive to the alignment of the primary mirror petals and the secondary mirror alignment. Precision mechanism alignment of these elements usually an important objective of the design. Precision features on the primary and secondary mirrors 12, 50 may include, for example, precision machined features that provide precision alignment. Positive force acting through mating interfaces using minimal lubrication may provide improved reliable precision mating.

In one example, the radiation detector (not shown) may have a detector focus that is set in the lab prior to launch. In other embodiments, the detector is focused in initial systems set up using a rapid focus adjustment system. In some optical designs, a primary mirror, secondary mirror, and additional mirrors may use refractive lenses. The use of lenses may enable maximum tolerance, insensitivity, or increased performance of the telescope.

The opto-mechanical deployable telescope designs disclosed herein may allow the radiation detector to view the primary mirror voids and associated background irradiance. This background irradiance may then be compensated for in the image utilizing progressive non-uniformity compensation (NUC). This NUC procedure may include taking frames of data interspersed with periodic acquisition of NUC frames. The NUC frames present a local average irradiance within the frame and may be subtracted from the data frames, thereby moving most of the contrast inhibiting background. Multiple methods to acquire the NUC image exist, including, but not limited to, moving an optical element, changing the optical pathway, and inserting a diffraction or scatter element.

The rear baffle of the baffling 18 (e.g., the combination of baffling cover members 70 and expandable baffling portion 72) may contribute to the background flux, which may reduce sensor sensitivity. The primary mirror petals may scatter light, which may also contribute to the background flux. In other embodiments, the optical design includes an intermediate focus and a Lyot stop to prevent the detector from seeing the rear baffle through the petal gaps. The Lyot stop may block a portion of the stray light. The Lyot stop may be an aperture stop placed at an exit pupil of the telescope, which in some embodiments is the image of the primary mirror aperture. The Lyot stop shape may match the shape of the primary mirror and block the radiation detector from viewing the primary mirror voids and the structure exposed behind it. The Lyot stop may be cooled to further reduce the background irradiants viewed by the detector.

The chassis hub 24 is part of a base structure in the examples disclosed herein. The base fulfills many functions, only one of which is a hub (e.g., chassis hub) for the mirror. In some arrangements, the chassis hub 24 may be a separate piece from the rest of the base. In some examples, portions of the chassis hub 24 may include a polished mirror surface providing an additional ($5^{th}$) segment of the mirror.

The terms kinematic and semi-kinematic are used herein to describe constraints for at least the purpose of aligning the petals of the telescope mirrors. Kinematic constraints allow a body to be held with the highest precision, exactly constraining each of the six degrees of freedom. Semi-kinematic constraints allow a small amount of over constraint while providing high precision.

Any object in three-dimensional space may be defined with six independent coordinates: X, Y, and Z (three translation), and yaw, pitch, and roll (three rotation). When each of these degrees of freedom is constrained fully and none are over constrained, the system is considered to be kinematically constrained. The theory of kinematic design requires perfectly rigid bodies that touch only at point (point contacts). When slight over constraints are allowed, the constraint is considered semi-kinematic. The kinematic constraint requires six point contacts that contain all six degrees of freedom. A hard sphere typically provides a good point contact when it meets another hard surface, which is why spheres are typically used in kinematic constraints. Whenever there is a degree of freedom that is not constrained, the system is under constrained. This happens when there are less than six point contacts, but it can still occur with six or more points. An example kinematically constrained system includes three balls that interface with a cone, a V-channel and a flat, or with three V-channels. The ball/cone interface has three point contacts, thus effectively constraining all three translations. The ball/groove contact has two point contacts, thus constraining roll and yaw. The ball/flat contact has one point contact, thus constraining pitch. Typically, the balls are positioned at corners of a triangle.

A semi-kinematic scenario may include replacing any one of the balls with a cylinder, or in some way replacing one of the point contacts with a line contact or flat surface. Kinematic and semi-kinematic systems may provide holding of a body with high precision, motion with little or no backlash or play, and repeatable, removable and replacement of a part in the same location. As discussed further herein, the kinematic and/or semi-kinematic features included in the example telescopes disclosed herein may assist in optical alignment. In a semi-kinematic mount, stresses may be significantly lower than in a kinematic mount. Further details concerning kinematic and semi-kinematic constraint is described in "*Kinematic and Quasi-Kinematic Constraints: What They Are and How They Work,*" Fellowes, David, December 2006, which is incorporated herein in its entirety by this reference.

Referring now to FIGS. 3A-6, another example opto-mechanical deployable telescope 100 is shown and described. The telescope 100 includes a primary mirror 112, an engine assembly 116, an alignment system 120, a radiation detector 122, and a hub 124. The telescope 100 may also include a support structure for a secondary mirror and baffling similar to those features shown in FIGS. 1 and 2, which have been removed for purposes of more clearly describing the alignment system 120.

Figure 3A:
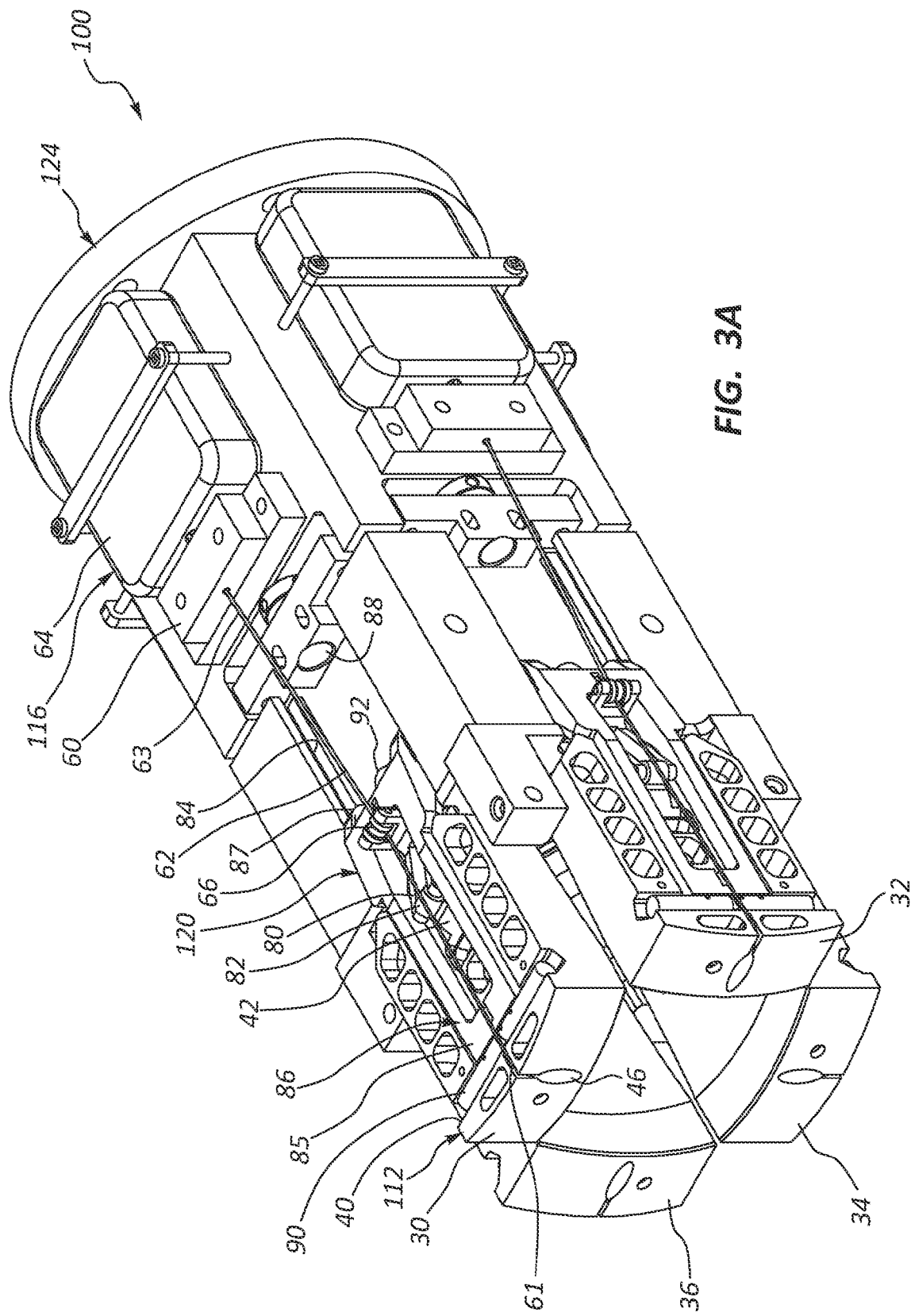
FIG. 3A is a perspective view of a portion of another example opto-mechanical deployable telescope in a stowed position in accordance with the present disclosure.
Figure 3D:
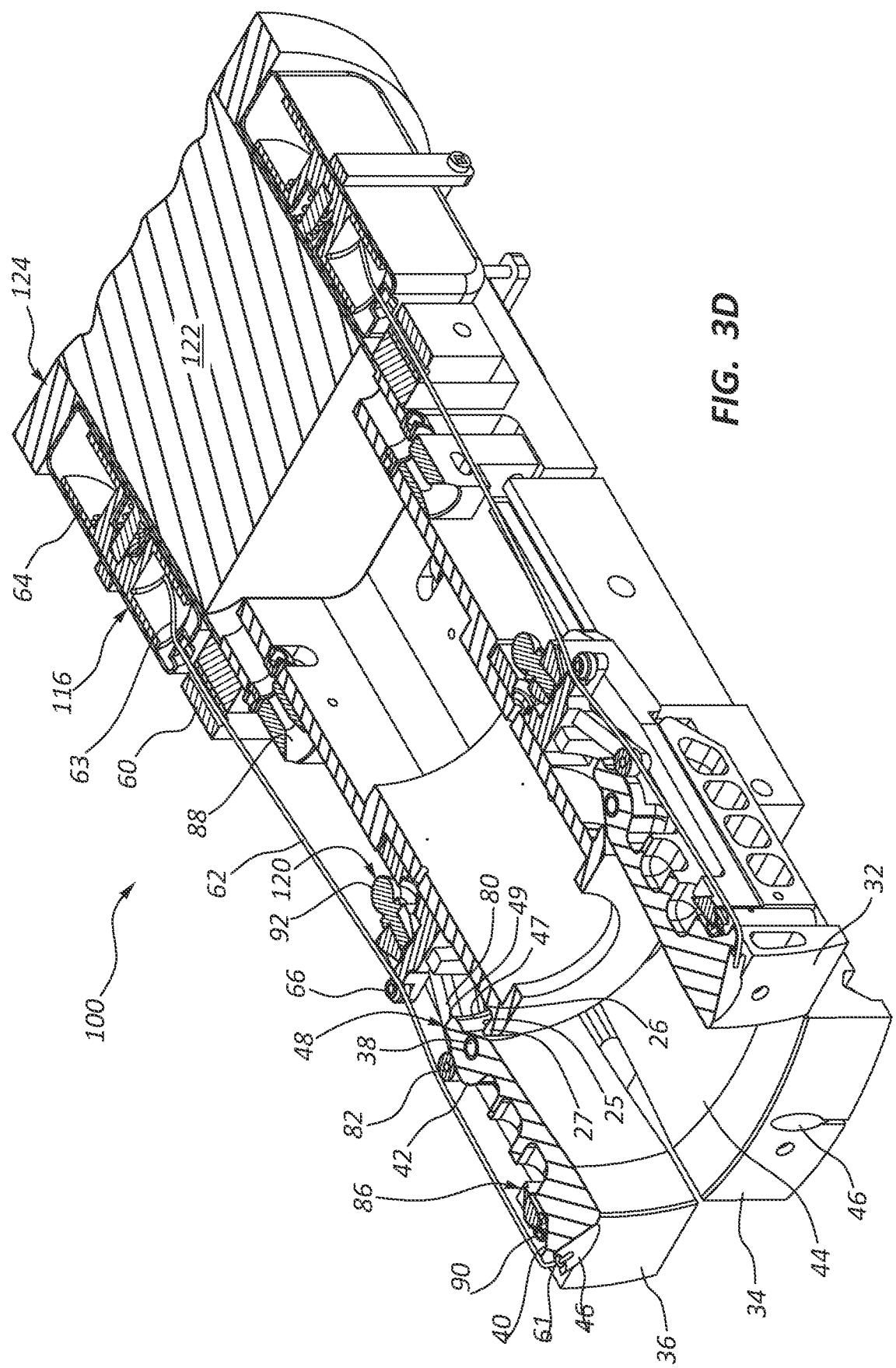
FIG. 3D is a cross-sectional perspective view of the opto-mechanical deployable telescope of FIG. 3C taken along cross-section indicators 3D-3D.
Figure 4B:
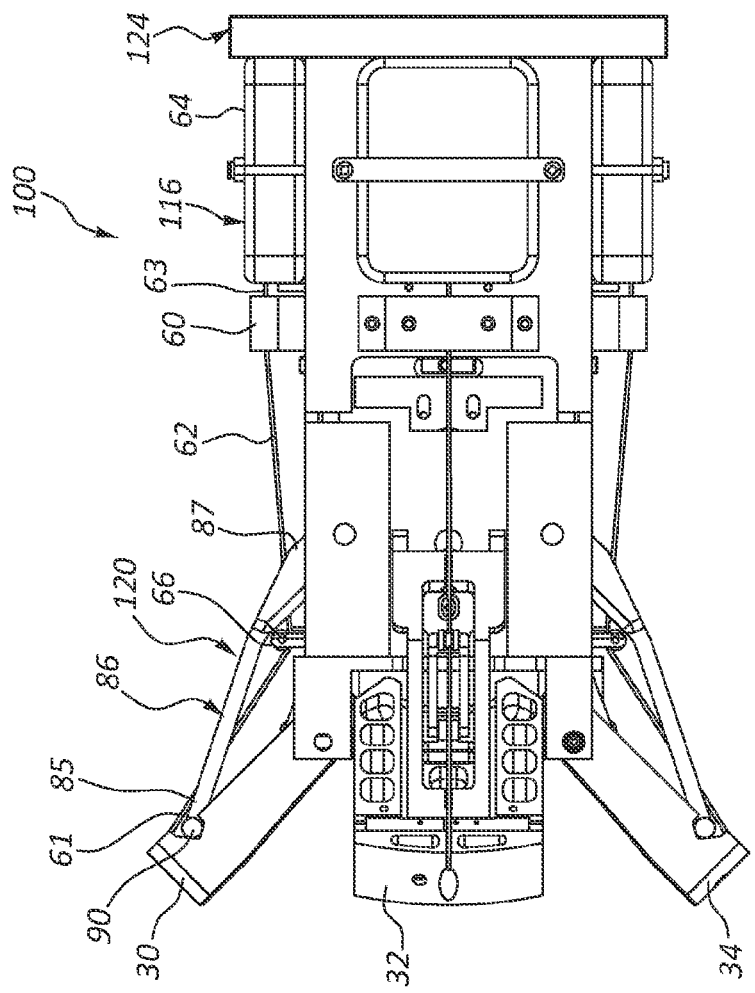
FIG. 4B is a side view of the opto-mechanical deployable telescope of FIG. 4A.
Figure 4C:
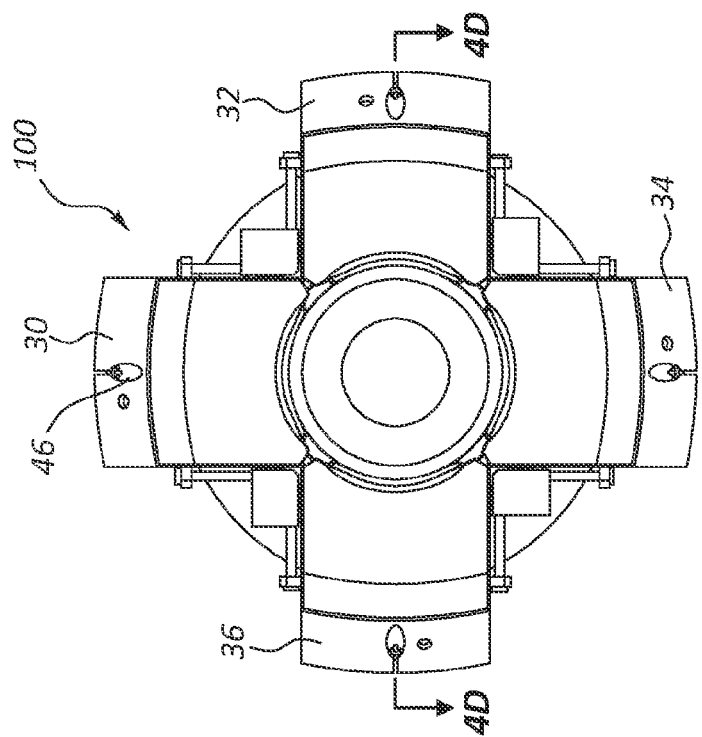
FIG. 4C is a front view of the opto-mechanical deployable telescope of FIG. 4A.
Figure 4D:
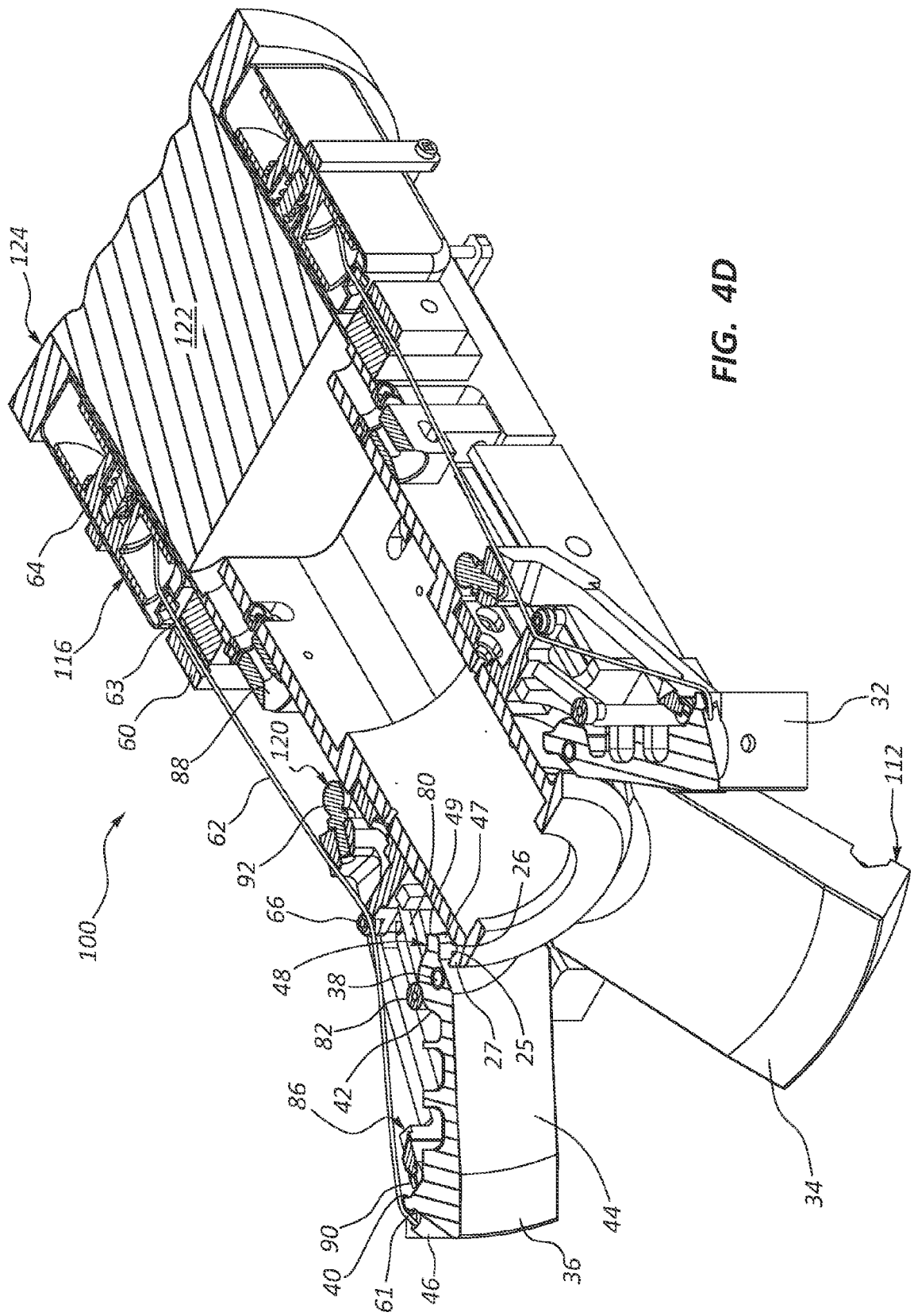
FIG. 4D is a cross-sectional perspective view of the opto-mechanical deployable telescope of FIG. 4C taken along cross-section indicators 4D-4D.
Figure 6:
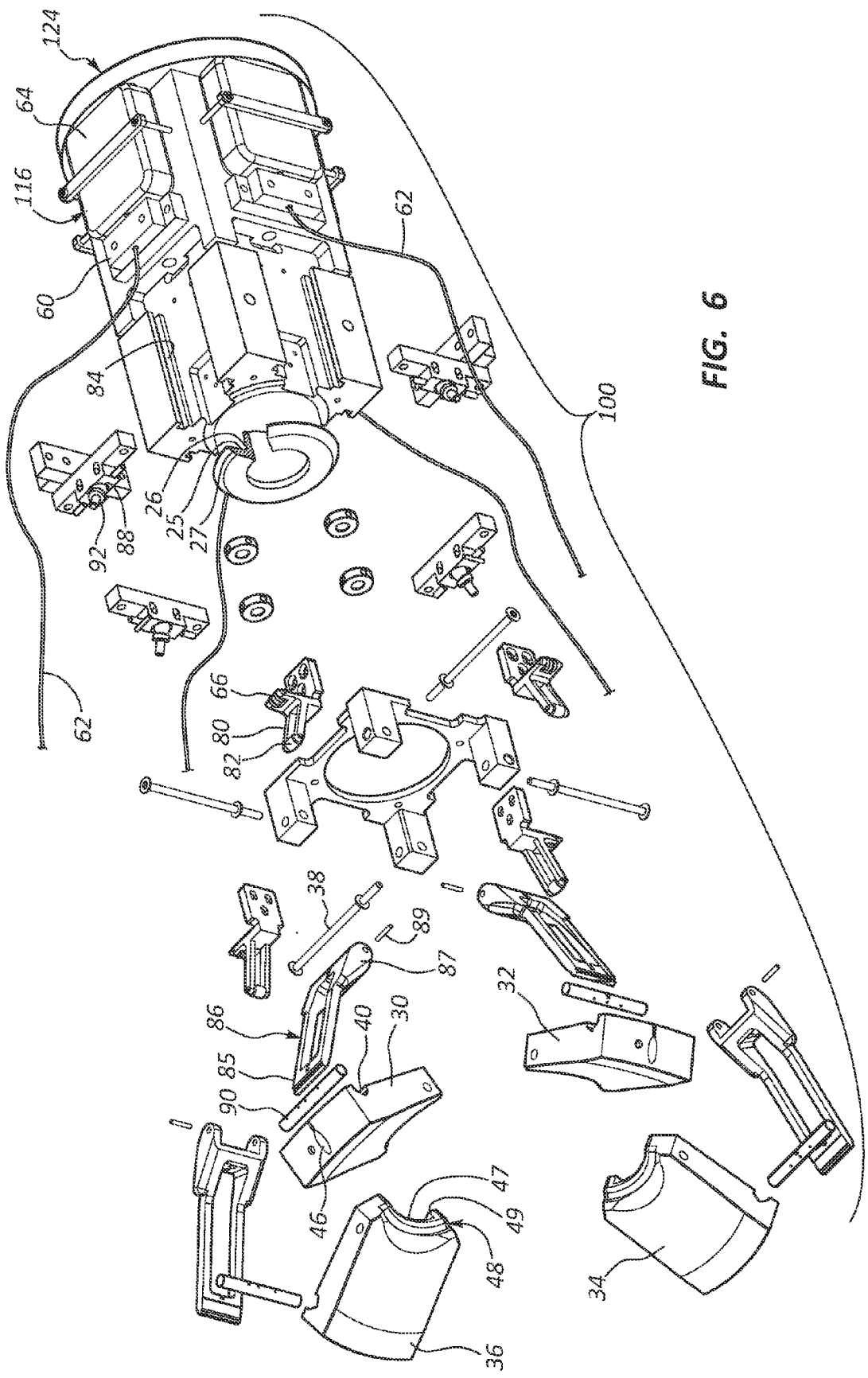
FIG. 6 is an exploded perspective view of the opto-mechanical deployable telescope of FIGS. 3A-5D.

Referring first to FIGS. 3A and 6, the primary mirror 112 (also referred to as a multiple petal primary or segmented mirror) includes first, second, third and fourth petals 30, 32, 34, 36 that are equally spaced apart circumferentially. The petals 30, 32, 34, 36 may each be attached to the hub 124 with a hinge member 38 and may each include a first alignment seat 40, a clamp surface 42, a mirror surface 44, a cable connector 46, and an alignment protrusion 48. The first alignment seat 40 may be constructed as a V-groove. The alignment protrusion 48 (see FIG. 6) may include an axial alignment surface 47 and a radial alignment surface 49. The axial and radial alignment surfaces 47,49 may be constructe as toroidal bumps or protrusions that interface with related alignment features on the hub 124 when the primary mirror 112 is in the deployed position shown in FIGS. 5A-5D to hold the petals of the primary mirror 112 in a predetermined aligned position. The alignment protrusion 48 may be part of a semi-kinematic mounting of the petals of the primary mirror 112 to the hub 124. The first alignment seat 40 may also be part of a semi-kinematic mounting of the petals of the primary mirror 112 to the hub 124. In at least some arrangements, the first alignment seat 40 and alignment protrusion 48 may be part of an alignment system of the telescope 100.

The engine assembly 116 includes a cable alignment member 60, a cable 62, and engine 64, and a cable support 66 for each of the petals of the primary mirror 112. The cable may have distal and proximal ends 61, 63. The distal end 61 is connected to one of the petals of the primary mirror 112 with a cable connector 46. The proximal end 63 extends through the cable alignment member 60 into the engine 64 where the engine 64 applies tension in cable 62 to move the petal from the stowed position of FIG. 3A to the deployed position of FIG. 5A. The engine 64 may be a stored energy engine or related stored energy device. In one example, the engine 64 includes a spring or other biasing member. The engine 64 may spool or collect the cable 62. Many types of stored energy devices may be used for engine 64. Preferably, the engine 64 may be configured to operate without a source of electrical power such as a battery.

In some arrangements, the engine assembly 116 includes a single engine that operates a plurality of the petals of primary mirror 112. The engine assembly 116 may also operate a support structure and associated secondary mirror, an additional primary mirror, and baffling of the telescope (not shown). Separate engines, motors, or desired stored energy devices may be used to operate each mirror, mirror petal deployment feature, and baffling feature of the telescope, or in other arrangements may operate multiple features of the telescope.

The alignment system 120 is shown and described with reference to FIGS. 3A, 4A, 5A and 6. The alignment system 120 includes a clamp support 80, a clamp 82, a track 84, a spar 86, a spar locating seat 88, and first and second spar alignment members 90, 92. The clamp support 80 positions the clamp 82 on the clamp surface 42 of a petal of the primary mirror 112. When the petal is in the deployed position of FIGS. 5A-5D, the clamp 82 applies a radially inward directed force on the petal to hold the alignment protrusion 48 of the petals against the alignment features of the chassis hub 124 as described in further detail below.

The spar 86 includes distal and proximal ends 85, 87. The first spar alignment member 90 is mounted to the distal end 85 and positioned within the first alignment seat 40 of the petals. The second spar alignment member 92 is mounted to the proximal end 87 of spar 86. The proximal end 87 travels within track 84 to move the second spar alignment member 92 from a position spaced apart from the spar locating seat 88 (see FIGS. 3A-4D) to a position in contact with the spar locating seat 88 (see FIGS. 5A-5D). The spar 86 may include at least one follower member 89 (see FIG. 6) that retains spar 86 in contact with and moving along track 84.

The hub 124 may include a support surface 27 and axial and radial alignment members 25, 26 (see FIGS. 3D, 4D, 5D and 6). The axial alignment member 25 is mounted to the support surface 27. The support surface 27 may be positioned in a rotational path of movement of the alignment protrusion 48 on the petals of primary mirror 112. The axial and radial alignment members 25, 26 are positioned at a location in which the axial and radial alignment surfaces 47, 49 of the alignment protrusion 48 contact the axial and radial alignment members 25, 26 to provide a final deployed position for the mirror petals. The axial and radial alignment members 25, 26 may be referred to as axial and radial seats or toroidal bumps. The axial and radial alignment members 25, 26 may provide a point contact for the alignment protrusion 48 in axial and radial directions. The axial and radial alignment members 25, 26 may have a small flat feature formed thereon at a location in which the alignment protrusion 48 contacts the axial and radial alignment members 25, 26.

In operation, the telescope 100 moves from a stowed position shown in FIGS. 3A-3D, to an intermediate deployed position shown in FIGS. 4A-4D, to a fully deployed position shown in FIGS. 5A-5D. The engine assembly 116 operates to pull the petals of primary mirror 112 from the stowed position shown in FIGS. 3A-3D through a rotation angle to the deployed position shown in FIGS. 5A-5D. The spar 86 moves along track 84 while the petals rotate about hinge member 38. An interface between hinge member 38 and an aperture of the petal within which the hinge member 38 resides has a gap that provides some "slop" or radial movement between the hinge member 38 and the aperture. The hinge member 38 guides the petal through the pivot rotation toward the deployed position so that the precision surfaces of the alignment protrusion 48 and the axial and radial alignment members 25, 26 and support surface 27 can interface and control a final position of the petal without the hinge member 38 controlling in a non-precise manner.

In a deployed position, the position of each of the petals of primary mirror 112 are controlled by the interface between the first spar alignment member 90 and the first alignment seat 40, the second spar alignment member 92 and the spar locating seat 88, the axial alignment surface 47 of alignment protrusion 48 and the axial alignment member 25, and the radial alignment surface 49 of the alignment protrusion 48 and the radial alignment member 26. This semi-kinematic mount of the petals of primary mirror 112 to the hub 124 is provided, at least in part, by the alignment system 120 and other features of the petals of primary mirror 112 and hub 124.

The features of telescope 100 shown in FIGS. 5A-5D provide concurrent deployment of the primary mirror 112 and alignment of each of the petals of the primary mirror 112 relative to each other using a semi-kinematic mounting of the petals to hub 124. Once the petals of primary mirror 112 are in the deployed position, no further adjustment of the petals may be required in order to provide relatively precise alignment of the petals relative to each other. As such, the need for secondary adjustment features such as actuators and small motors that require additional power and remote control can be eliminated from the telescope. Also, feedback mechanisms such as wavefront sensors that control the aforementioned actuators or motors can be eliminated. Further, in one embodiment, the clamp 82 provides a radially inward directed force that holds the petals of primary mirror 112 against the axial and radial alignment members 25, 26 so that the alignment of the petals of primary mirror 112 is maintained during operation of telescope 100 in the deployed position.

Other types of features and structures for the telescope may be used to provide the desired kinematic or semi-kinematic mounting of the petals of primary mirror 112 to the hub 124. The examples described herein are merely exemplary of the application of the principles of applying semi-kinematic mounting for an opto-mechanical deployable telescope are embodied in the examples disclosed herein. Furthermore, various components of the telescopes disclosed herein may be rearranged to provide a similar outcome. In one example, the first and second spar alignment members are carried by the petals of the primary mirror and the hub, respectively, and the spar carries a V-groove and conical recess to receive the first and second spar alignment members.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. An opto-mechanical deployable telescope, comprising:
    a hub;
    at least one deployable multiple petal primary mirror mounted to the hub;
    a deployment assembly operable to move the at least one primary mirror between a stowed position and a deployed position; and
    a deployment engine assembly operable to power the deployment assembly using stored mechanical energy;
    wherein:
        the deployment assembly includes a kinematic or semi-kinematic interface between the hub and the at least one primary mirror to hold petals of the at least one primary mirror in alignment relative to each other in the deployed position; and
        each petal of the at least one primary mirror is separately attached to the hub with a hinge connection, the hinge connection providing radial movement of the petals when in the deployed position that permits the deployment assembly rather than the hinge connection to control alignment of the petals.

2. The telescope of claim 1, wherein the petals of the at least one primary mirror are substantially aligned relative to each other without a secondary alignment mechanism or device.

3. The telescope of claim 1, further comprising a deployable support structure and at least one secondary mirror carried by the deployable support structure, the at least one secondary mirror being positionable relative to the at least one primary mirror to optimize optical imaging on a focal plane.

4. The telescope of claim 1, further comprising a baffling deployable into a position around the at least one primary mirror.

5. The telescope of claim 4, wherein the baffling comprises a spring loaded collapsible support.

6. The telescope of claim 1, wherein the deployment assembly includes a radial and axial positioning member that at defines at least in part the deployed position, the radial and axial positioning member including at least one toroid structure on a petal of the at least one primary mirror or the hub.

7. The telescope of claim 1, wherein the deployment assembly includes a spar having a first end connected to a petal of the at least one primary mirror with a first interface, the first interface including a cylinder positioned in a V-groove, and a second end connected to the hub with a second interface, the second interface including a spar alignment member positioned in a spar locating seat.

8. The telescope of claim 1, further comprising a detector configured to minimize viewing voids between petals of the at least one primary mirror and associated background irradiance.

9. The telescope of claim 1, wherein the deployment assembly comprises a clamp or spring that applies a radially inward directed force to a petal of the at least one primary mirror when in the deployed position.

10. The telescope of claim 1, wherein the deployment assembly comprises at least one cable connecting the deployment engine assembly to a petal of the at least one primary mirror.

11. The telescope of claim 1, wherein the at least one primary mirror includes an aperture size when in the deployed position that is greater than a maximum width dimension of the telescope in the stowed position.

12. The telescope of claim 1, wherein the deployment engine assembly comprises at least one compressed spring engine that provides positive pressure to hold petals of the at least one primary mirror in the deployed position.

13. An opto-mechanical deployable telescope, comprising:
    a hub;
    a deployable primary mirror positioned on the hub and comprising a plurality of petals, the plurality of petals being pivotable from a stowed position to a deployed position; and
    a deployment assembly configured to operate the plurality of petals between the stowed and deployed positions and hold the plurality of petals in alignment relative to each other in the deployed position using a kinematic or semi-kinematic interface between the hub and the plurality of petals:
    wherein each petal of the at least one primary mirror is separately attached to the hub with a hinge connection, the hinge connection providing radial movement of the petals when in the deployed position that permits the deployment assembly rather than the hinge connection to control alignment of the petals.

14. The telescope of claim 13, wherein the deployment assembly includes a separate stored energy device to deploy each individual petal.

15. The telescope of claim 13, wherein the deployment assembly includes a plurality of point contact interfaces between the hub and the plurality of petals that controls alignment of the plurality of petals and the hub.

16. A method of deploying an opto-mechanical deployable telescope, comprising:
    providing a hub, at least one primary mirror mounted to the hub, and a deployment assembly, the at least one primary mirror including a plurality of petals;
    moving the plurality of petals from a stowed position to a deployed position with the deployment assembly;
    aligning the plurality of petals relative to each other with the deployment assembly while moving the plurality of petals into the deployed position, wherein aligning the plurality of petals includes providing a semi-kinematic interface between the plurality of petals and the hub;
    wherein each petal of the at least one primary mirror is separately attached to the hub with a hinge connection, the hinge connection providing radial movement of the petals when in the deployed position that permits the deployment assembly rather than the hinge connection to control alignment of the petals.

17. The method of claim 16, wherein aligning the plurality of petals includes providing a first interface including a cylinder positioned in a V-groove, a second interface including a spar alignment member positioned in a spar locating seat, and an axial and radial positioning arrangement operable between the hub and the plurality of petals.

18. The method of claim 16, wherein the deployment assembly includes a separate stored energy engine and cable for each of the plurality of petals, the cable interconnecting the petal to the stored energy engine, wherein moving the plurality of petals includes applying tension in the cables with the stored energy engines.

\* \* \* \* \*